United States Patent [19]
Aramaki et al.

[11] 3,964,873
[45] June 22, 1976

[54] HEATING DEVICE HAVING DUMBBELL-SHAPED REACTION TUBES THEREIN

[75] Inventors: Seigo Aramaki; Katsuzo Sudo; Mitsuo Tani, all of Hiroshima; Takehiko Sato, Yokkaichi; Yuuji Onishi, Yokkaichi; Nobuhiro Sakaguchi, Yokkaichi, all of Japan

[73] Assignees: Mitsubishi Jukogyo Kabushiki Kaisha; Mitsubishi Petrochemical Company Limited, both of Tokyo, Japan

[22] Filed: July 12, 1974

[21] Appl. No.: 487,883

Related U.S. Application Data

[63] Continuation of Ser. No. 312,309, Dec. 5, 1972, abandoned.

[30] Foreign Application Priority Data

Dec. 7, 1971   Japan.................. 46-98779

[52] U.S. Cl. ..................... 23/277 R; 122/235 C; 138/177; 159/28 VH; 165/105; 196/110
[51] Int. Cl.² .................. F16L 9/06; F22B 37/12; F28D 15/00
[58] Field of Search .............. 23/277 R; 196/110; 202/237; 122/6 A, 235 C; 138/177, 178, DIG. 11; 165/105; 159/28 R, 28 VH

[56] References Cited
UNITED STATES PATENTS

| | | | |
|---|---|---|---|
| 1,449,782 | 3/1923 | Rutherford | 165/148 |
| 1,505,701 | 8/1924 | Cox | 165/148 |
| 1,839,919 | 1/1932 | Hall | 138/177 X |
| 2,914,386 | 11/1959 | Shapleigh | 23/277 R |
| 3,585,540 | 6/1971 | Schuttloffel et al. | 138/177 X |
| 3,671,198 | 6/1972 | Wallace | 23/277 R |

FOREIGN PATENTS OR APPLICATIONS

| | | | |
|---|---|---|---|
| 95,810 | 8/1922 | Switzerland | 165/183 |

*Primary Examiner*—Morris O. Wolk
*Assistant Examiner*—Bradley R. Garris

[57] ABSTRACT

A heater tube for use in a fluid heating device, which is used, for example, as a thermal decomposing device of hydrocarbons. The heater tube has a dumbbell shape in cross section.

1 Claim, 3 Drawing Figures

HEATING DEVICE HAVING DUMBBELL-SHAPED REACTION TUBES THEREIN

This is a continuation of copending application Ser. No. 312,309 filed Dec. 5, 1972 and now abandoned.

SUMMMARY OF THE INVENTION

The present invention relates to a heater tube having a dumbbell-shape in cross section for use in a heating device for fluid, i.e. liquid and/or gas. More particularly, the present invention relates to a heating device which is used, for example, as a thermal decomposing device to thermally decompose hydrocarbons which is in normally gas and liquid state, to produce petrochemical material such as olefine and aromatic hydrocarbons, in which thermal decomposition occurs in a tube having dumbbell-shape in cross section, which provides an increased thermal decomposition capacity. By using the heating device as a thermal decomposing device as aforesaid, time for reaction can be reduced, yield of olefine can be increased and by-product can be decreased.

In the prior art of the thermal decomposition, it has been known that the above mentioned effects can be obtained by employing a heater tube having an oval or generally oval shape, in cross section, in a thermal decomposing device, as disclosed in Japanese Pat. No. 585349 (Patent Publication No. 11281/1970) corresponding to U.S. Pat. No. 3,572,999. The present invention is directed to an improvement of the heater tube as disclosed in said Japanese Patent, which provides further improved effects by employing a special dumbbell-shape in cross section as a modified form of the generally oval shape.

In general, the heater tube having oval or generally oval shape in cross section for use in industry must have relatively large thickness or suitable reinforcing member therein, in order to obtain sufficient strength to withstand the internal pressure in said tube. Accordingly, manufacturing cost of the tube is substantially increased.

The present invention provides a heater tube having dumbbell-shaped cross section which has been designed to make up the deficiency in strength of the generally oval shaped heater tube and which remarkably improve the constructional strength and decreases the manufacturing cost of the heater tube.

When the heater tube according to the present invention is used as a thermal decomposing device, it must be so arranged that said tube extends in longitudinal direction in a plane at the center of a thermal decomposing furnace, in the same manner as the conventional reaction tube having oval shaped cross section, and that said tube has its major diameter facing toward heating means located at both sides of said thermal decomposing furnace. Such an arrangement of the heater tube is advantageous in that the tube receives radiation heat easily and uniformly from the heating means at the both sides of the furnace.

In accordance with the present invention there is provided a heater tube for heating fluid, having a dumbbell-shape in a cross section perpendicular to a longitudinal axis of said tube, in which:

$$10 \text{ mm} < a < 60 \text{ mm}$$

$$5 \text{ mm} < b < 2000 \text{ mm}$$

$$0° < \Psi < 60°$$

where
- $a$ = the radius of curvature of the inside surface of the heater tube at circular portions of the dumbbell-shaped cross section,
- $b$ = the radius of curvature of the inside surface of the heater tube at narrow part of the dumbbell-shaped cross section,
- $\Psi$: angle between a line connecting a center of curvature of the inside surface at said narrow part and a center of the inside surface at one of said circular portions and a line extending from said center of curvature of the inside surface at said narrow part through a center of the narrow part.

The invention will be explained with reference to the drawings.

DETAILED DESCRIPTION

Figure 1:
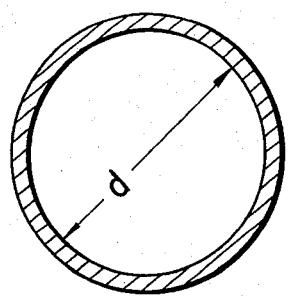
FIG. 1 is a cross section of an example of a reaction tube heretofore used as a heater tube in a thermal decomposing device for hydrocarbons.
Figure 2:
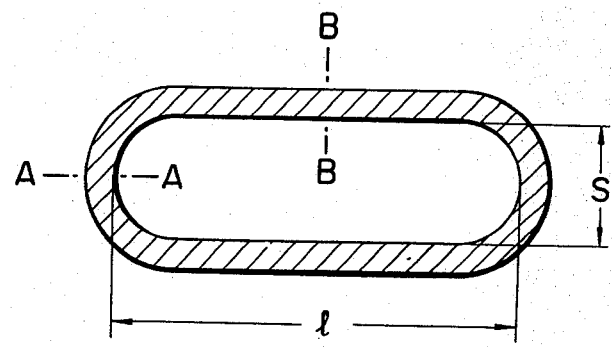
FIG. 2 is a cross section of another example of the conventional reaction tube.

Referring to the drawings, FIG. 1 shows an example of the conventional heater tube, which has a circular cross section having an inner diameter $d$, and FIG. 2 shows another example of the conventional heater tube, which has an oval cross section having a major inner diameter $l$ and a minor inner diameter $S$.

Figure 3:
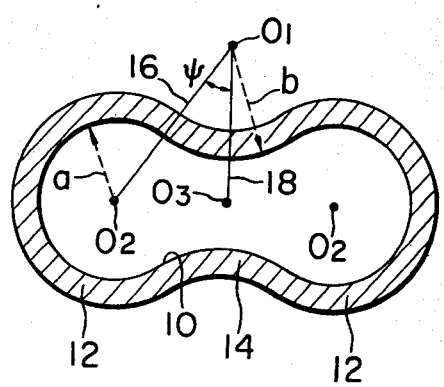
FIG. 3 is a cross section showing a heater tube according to the present invention.

FIG. 3 illustrates a heater tube according to the present invention, which has a dumbbell-shaped cross section, in which:

$$10 \text{ mm} < a < 60 \text{ mm}$$

$$5 \text{ mm} < b < 2000 \text{ mm}$$

$$0° < \Psi < 60°$$

where
- $a$ = the radius of curvature of the inside surface 10 of the heater tube at circular portions 12 and 12 of the dumbbell-shaped cross section,
- $b$ = the radius of curvature of the inside surface 10 at narrow part 14,
- $\Psi$: angle between a line 16 connecting a center $0_1$ of curvature of the inside surface 10 at the narrow part 14 and a center $0_2$ of the inside surface 10 at one of said circular portions 12 and a line 18 extending from said center $0_1$ through a center $0_3$ of the narrow part 14.

The invention will be further explained with reference to some detailed examples, which are to be considered only as illustrative and not restrictive descriptions.

EXAMPLE 1

An oval tube as shown in FIG. 2 and dumbbell-shaped tubes as shown in FIG. 3 having same cross sectional area have been manufactured. Table 1 shows the shapes and the sizes of these tubes.

Table 1

Comparison of Reaction Tubes

| Shape | Size | | Cross Sectional Area (mm²) | Peripheral Length (mm) |
|---|---|---|---|---|
| Oval | Minor Dia. s (mm) 50 | Major Dia. l (mm) 120 | $5.46 \times 10^3$ | $2.97 \times 10^2$ |
| | $\psi$ (°) | a (mm) | b (mm) | |
| Dumbbell-shape | 5 | 26.0 | 358.0 | |
| | 10 | 26.8 | 157.7 | $5.46 \times 10^3$ | $2.97 \times 10^2$ |
| | 15 | 27.5 | 91.1 | |
| | 20 | 28.2 | 57.9 | |
| | 25 | 28.7 | 38.1 | |
| | 30 | 29.2 | 25.0 | |
| | 35 | 29.6 | 15.8 | |

As to the oval tube and the dumbbell-shaped tubes having shapes and sizes as shown in Table 1, the stress and the life time were calculated, which are shown in Table 2. In this calculation, all of the oval tube and the dumbbell-shaped tubes had same thickness, and in Table 1, the stress and the life time as to the oval tube were adopted as reference value 1.00. In the reaction tube as shown in Table 1, the stress produced by the internal pressure has maximum value on the inside wall at the section A—A in FIG. 2, while the temperature of the wall of the reaction tube is higher at the outside wall than at the side wall, so that the life of the reaction tube has minimum value at the outside wall at the section B—B. Therefore the stress at the outside wall at the section B—B is shown in Table 2. The life time was determined on the calculation of the stress at the outside wall at the section B—B of the reaction tube under such thermal decomposition conditions as the entire length of the reaction tube 55 mm, the amount of the processed material 40 T/H. COIL (Treating amount (ton) per hour and per coil), the amount of steam 2.0 T/H. COIL, the temperature at the outlet of the thermal decomposing furnace 820°C. and the pressure at the outlet 1.0 kg/cm²G, and the creep strength at the operating temperature of the material HK 40 of the reaction tube.

Table 2

Stress and Life Time of Reaction Tube

| Shape | | Stress | Life Time |
|---|---|---|---|
| Oval | | 1.000 | 1.000 |
| Dumbbell-shape | $\psi =$ 5° | 0.987 | 1.058 |
| | 10° | 0.974 | 1.121 |
| | 15° | 0.961 | 1.190 |
| | 20° | 0.947 | 1.267 |
| | 25° | 0.933 | 1.351 |
| | 30° | 0.919 | 1.445 |
| | 35° | 0.904 | 1.550 |

It is apparent from Table 2 that in case of the dumbbell-shaped tubes having same cross-sectional area and same peripheral length as those of the oval tube, as the angle $\Psi$ is increased, the stress is decreased and the life time is increased. Particularly, in the dumbbell-shaped tube having $\Psi = 35°$ the stress is decreased at the amount of 9.6% relatively to the oval tube and the life time is increased to 1.56 times larger than the oval tube. That is, by using the dumbbell-shaped tube having same cross sectional area and same peripheral length as those of the oval tube, the life time is increased as compared with the oval tube, so that the thickness of the tube can be decreased, thereby decreasing the manufacturing cost.

EXAMPLE 2

Material treating amount of the dumbbell-shaped tube and the oval tube having same life time in Example 1 are shown in Table 3. In this example the cross sectional area, the peripheral length and the thickness of the dumbbell-shaped tube are assumed to be same as those of the oval tube.

Table 3

| Shape & Size | Material treating amount | |
|---|---|---|
| | Oval tube S = 50 mm l = 120 mm | Dumbbell-shaped $\psi = 35°$ a = 29.6 mm b = 15.8 mm |
| Material treating amount | 4.00 T/H.COIL | 4.45 T/H. COIL |

It is understandable from Table 3 that the material treating rate can be increased from 4.00 T/H.COIL to 4.45 T/H.COIL (Treating amount (ton) per hour and per coil) by using the dumbbell-shaped tube having same cross sectional area and same peripheral length as those of the oval tube, and thus the manufacturing cost of the thermal decomposing furnace can be decreased about 10%.

In accordance with the present invention, yield is increased when the dumbbell-shaped tube is used instead of the oval tube under same life time and same material treating rate as those of the latter so that the reaction time is decreased. The following example shows the increase of yield.

EXAMPLE 3

The following two types of heater tube were used
1. The oval tube as shown in FIG. 2. Sizes are as follows:

s = 50 mm l = 120 mm entire length = 60 m

2. The dumbbell-shaped tube as shown in FIG. 3. Sizes are as follows:
cross sectional area and thickness are same as those of the oval tube 1

Ψ = 35° a = 29.6 mm b = 15.8 mm entire length = 55 m

The material naphtha as shown in Table 4 was thermally decomposed in the above heater tubes having different lengths, namely, different reaction times.

Table 4

| Properties of Naphtha | |
|---|---|
| Specific gravity (API) | 71.0 |
| ASTM DISTILLATION (°C) | |
| IBP | 36.0 |
| 50 Vol% | 95.0 |
| EP | 170.0 |
| PARAFFIN (Vol %) | 74.0 |
| OLEFINE (Vol %) | 1.0 |
| NAPHTHENE (Vol %) | 17.0 |
| AROMATICS (Vol %) | 8.0 |
| SULFUR CONTENT (WT %) | 0.04 |

The material naphtha was preheated to 600°C. and then it was mixed with steam and introduced into the two heater tubes. The feeding rate of the material naphtha was 4.0 T/HR, while the feeding rate of the steam was 2.0 T/HR. The temperature at the outlet of the thermal decomposing furnace was as follows:

1  820°C. the oval tube
2  830°C. the dumbbell-shaped tube

The pressure at the outlet was 1.0 Kg/cm² G.

When the thermal decomposing reaction was carried out under the above conditions, the yield as shown in Table 5 was obtained.

Table 5

| Types and Characteristics of Reaction Tube | | |
|---|---|---|
| REACTION TUBE TYPE | Oval Tube | Dumbbell-shaped tube |
| SHAPE | | ψ = 35° |
| | S = 50 mm | a = 29.6 mm |
| | l = 120 mm | b = 15.8 mm |
| ENTIRE LENGTH | 60 m | 55 m |
| DECOMPOSITION CONDITION | | |
| Material treating rate | 4.0 Ton/HR | 4.0 Ton/HR |
| STEAM | 2.0 Ton/HR | 2.0 Ton/HR |
| REACTION TIME | 0.46 Sec. | 0.40 Sec. |
| DECOMPOSING TEMPERATURE | 820°C. | 830°C. |

Table 5-continued

| Types and Characteristics of Reaction Tube | | |
|---|---|---|
| FURNACE OUTLET PRESSURE | 1.0 Kg/cm²G | 1.0 Kg/cm²G |
| YIELD | | |
| TOP GAS | 16.0 weight % | 15.7 weight % |
| ETHYLENE | 26.0 weight % | 27.0 weight % |
| P-P | 15.6 weight % | 16.2 weight % |
| B-B | 8.7 weight % | 9.0 weight % |
| EHE | 3.2 weight % | 3.0 weight % |

It is understandable that in accordance with the present invention the strength of the heater tube is substantially increased compared with the conventional oval tube having corresponding material treating rate and life time, so that the reaction time can be decreased and the decomposing temperature can be increased, whereby the yield of olefine is improved and by-produced secondary product is decreased.

We claim:

1. In a furnace for the thermal decomposition of hydrocarbons comprising a chamber having heating means positioned at opposite locations therein, and at least one elongate reaction tube spaced between said heating means; the improvement which comprises said reaction tube having a cross sectional dumbbell-shape and having in cross section perpendicular to the longitudinal axis of said tube a major and minor diameter of the following interrelated characteristics:

$0° < Ψ < 60°$ $10 \text{ mm} < a < 60 \text{ mm}$ $5 \text{ mm} < b < 2000 \text{ mm}$ where
 $a$ = the radius of curvature of the inside surface of the reaction tube at the circular portions of said dumbbell-shape,
 $b$ = radius of curvature of the inside surface of the reaction tube at the narrow portion of said dumbbell-shape and,
 $Ψ$ = the angle between a line connecting the center of curvature at the narrow portion and the center of curvature at the circular portion and a line extending from said center of curvature at the narrow portion through the center of the narrow part
and wherein the major diameter of the dumbbell-shaped reaction tube is parallel to each of said heating means.

* * * * *